US007800326B2

United States Patent
Zhu et al.

(10) Patent No.: US 7,800,326 B2
(45) Date of Patent: Sep. 21, 2010

(54) BRUSHLESS D.C. MOTOR WITH RFID ROTOR MAGNET POSITION SENSING

(75) Inventors: Shengbo Zhu, San Jose, CA (US); Su Shiong Huang, Bellevue, WA (US)

(73) Assignee: Silicon Valley Micro MCorp., San Jose, CA (US)

( * ) Notice: Subject to any disclaimer, the term of this patent is extended or adjusted under 35 U.S.C. 154(b) by 417 days.

(21) Appl. No.: 12/075,048

(22) Filed: Mar. 8, 2008

(65) Prior Publication Data

US 2009/0224702 A1 Sep. 10, 2009

(51) Int. Cl.
*H02P 6/00* (2006.01)
(52) U.S. Cl. .............................. 318/400.16; 318/400.37; 318/16
(58) Field of Classification Search ............ 318/400.16, 318/400.37, 16; 310/68 B, 232; 340/10.1
See application file for complete search history.

(56) References Cited

U.S. PATENT DOCUMENTS

2004/0169434 A1* 9/2004 Washington et al. ........ 310/232

* cited by examiner

Primary Examiner—Karen Masih

(57) ABSTRACT

A brushless D.C. motor has a rotor with a plurality of magnets secured to a mounting surface. Each magnet has an RFID tag secured to a magnet surface, with each RFID tag having stored therein a unique identification character serving to identify the magnet. A stator has a plurality of pole teeth separated by slots, each pole tooth having a power coil wound thereabout. A plurality of RFID interrogation antennae are mounted adjacent the pole teeth. An RFID reader generates r.f. interrogation signals broadcast by the antennae to the RFID tags. The RFID tags respond by broadcasting the unique identification character whenever an interrogation signal is sensed as the tag enters the region of a pole tooth. This position and magnet identification information is received by the RFID reader, which processes the information and sends it to a motor controller and driver unit, which supplies operating power to the individual power coils. The coils are connected in either a conventional star configuration or individually to the electrical power source to provide improved commutation control of the motor. After assembly, the motor is calibrated to eliminate mechanical, electrical and magnetic irregularities by operating the motor in a generator mode, examining the emf generated by the power coils, and developing compensating parameters to alter the driving signals for the power coils.

15 Claims, 6 Drawing Sheets

BRUSHLESS D.C. MOTOR WITH RFID ROTOR MAGNET POSITION SENSING

BACKGROUND OF THE INVENTION

This invention relates to brushless D.C. motors used in a variety of applications. More particularly, this invention relates to a rotor magnet position sensor technique for such motors using RFID tags mounted on the magnets and associated tag reading elements.

Brushless D.C. motors are known and are finding increasing use in a wide variety of applications. Such motors rely on switching circuits in the electrical power distribution system to provide the necessary electrical power commutation required to operate the motor. The switching circuits rely on position feedback signals which indicate the rotational position of magnets mounted on the motor rotor to properly time the application of electrical power to the stator coils. The most widely implemented current type of rotor position feedback signal generator uses a plurality of rotor magnet position sensors, usually Hall effect sensors, to provide the necessary rotor magnet position feedback signals. FIG. 1 illustrates an example of a known brushless D.C. motor using Hall effect rotor magnet position sensors. As seen in this Fig., which is a schematic sectional view taken normal to the rotational axis of the motor, a rotor 11 is mounted for rotation in a direction suggested by arrow 12. A plurality of permanent magnets 13-1 . . . 13-4 is secured to the outer surface of rotor 11. The magnets 13-1 . . . 13-4 are arranged in alternating magnetic polarities, such that the north pole of magnet 13-1 is flanked by the south poles of magnets 13-2 and 13-4, the south pole of magnet 13-2 is flanked by the north poles of magnets 13-1 and 13-3, etc. Rotor 11 is concentrically mounted within a stator 15 fabricated from a magnetizable material, such as a laminated stack of steel plates, and having a plurality of pole teeth 16-1 . . . 16-3 and a corresponding plurality of axially extending slots 17-1 . . . 17-3. Power distribution coils 18-1 . . . 18-3 are individually wound about pole teeth 16-1 . . . 16-3, and these coils are connected in a star configuration to the electrical power source shown in FIG. 2. Rotor 11 is caused to rotate by the proper sequential application of electrical power to coils 18-1 . . . 18-3, which generate magnetic fields capable of interacting with the magnetic fields permanently generated by rotor magnets 13-1 . . . 13-4 to provide rotational force to rotor 11.

In the FIG. 1 embodiment, rotor magnet position feedback signals are provided by Hall effect sensors 19-1 . . . 19-3, which use the well-known Hall effect to generate electrical rotor magnet position feedback signals in response to the passage thereby of the magnetic fields generated by rotor magnets 13-1 . . . 13-4. As seen in FIG. 2, which is a schematic partial block diagram of the power switching and distribution circuitry for the brushless D.C. motor illustrated in FIG. 1, the rotor magnet position feedback signals generated by sensors 19-1 . . . 19-3 are coupled to a motor controller and driver unit 21. Unit 21 incorporates a microcontroller which processes these feedback signals and uses the positioning information contained therein to control the operation of a bank of power switching transistors 22-1 . . . 22-6 connected as shown, which are used to apply electrical power from a D.C. source (illustrated as a battery 24) to the stator coils 18-1 . . . 18-3. By properly sequencing the application of electrical power to coils 18-1 . . . 18-3, the rotor 11 is caused to rotate at the desired speed, thereby operating the motor. Further information regarding the structure, function and operating characteristics of brushless D.C. motors using Hall effect rotor magnet positioning sensors can be found in the following U.S. Patents, the disclosures of which are hereby incorporated by reference: U.S. Pat. No. 6,819,068 issued Nov. 16, 2004; U.S. Pat. No. 6,934,468 issued Aug. 23, 2005; U.S. Pat. No. 6,941,822 issued Sep. 13, 2005; and U.S. Pat. No. 6,954,042 issued Oct. 11, 2005.

Although brushless D.C. motors equipped with Hall effect rotor magnet position feedback sensors have been widely implemented in the past, certain disadvantages exist with this design configuration. Firstly, the operating characteristics of Hall effect sensors are temperature dependent. Consequently, in applications requiring more than a minimum of precision some means of compensating for the operating characteristics temperature dependency must be incorporated into the motor controller and driver unit 21. At the very least, this requires the addition of a temperature sensing element adjacent the Hall effect sensors, and special temperature compensation routines incorporated into the motor controller and driver unit 21. Further, Hall effect sensors do not operate reliably at elevated temperatures in excess of about 120 degrees Centigrade. While this temperature sensitivity does not adversely affect the operation and reliability of such sensors at relatively low temperatures within the reliable operating range (when combined with the temperature compensation routines), in many applications the environmental temperature to which the motor is subjected frequently exceeds 120 degrees Centigrade. In such a temperature environment, temperature compensation does not guarantee reliable operation of the Hall effect sensors. Consequently, either special cooling techniques must be incorporated into the brushless D.C. motor, or the Hall effect sensor design must be replaced by some other position signal feedback technique. Still further, Hall effect sensors do not function well in dirty environments regardless of temperature considerations, such as applications in which dusty or oily conditions are encountered. In such contaminated environments the only solution has been to periodically clean the interior of the motor.

Efforts to design a brushless D.C. motor having rotor magnet position feedback sensors devoid of the above-noted disadvantages have not been successful to date.

SUMMARY OF THE INVENTION

The invention comprises a rotor magnet position feedback technique which is devoid of the disadvantages encountered with the use of Hall effect sensors, and which provides additional advantages as noted herein.

From an apparatus standpoint, the invention comprises a brushless D.C. motor having a rotor with a surface provided with a plurality of permanent rotor magnets distributed therealong, each rotor magnet having an RFID tag attached thereto containing a unique identification character serving to identify the rotor magnet; a stator having a plurality of pole teeth separated by axially extending slots, each one of the pole teeth having a power coil wound thereabout; and a plurality of RFID interrogation antennae each mounted adjacent a different one of the pole teeth for providing r.f. interrogation signals for the RFID tags for enabling the RFID tags to broadcast an r.f. signal containing the unique identification character to an interrogating one of the antennae when a given one of the RFID tags is within the broadcast range of a given one of the antennae, the unique identification signal serving to identify the particular one of the rotor magnets entering the broadcast range. In the preferred embodiment, adjacent magnets along the rotor surface are arranged with opposite magnetic polarities and the rotor surface is an outer substantially cylindrical surface, with the rotor being configured for rotation within the stator.

In one embodiment, the power coils are connected in a star configuration. In another embodiment, the power coils are connected individually to a power driver unit for individual power control.

An RFID reader is coupled to the antennae for generating the r.f. interrogation signals, the RFID reader having an output for manifesting the unique identification signal, and a motor controller and driver unit has an input for receiving the unique identification signal and an output for providing power coil driving signals at least partially dependent upon the unique identification signal.

In an alternate embodiment, each power coil is individually coupled to the motor controller and driver unit to enable individual application of power to each of the power coils.

From a system standpoint, the invention comprises a brushless D.C. motor system having a rotor with a surface provided with a plurality of permanent rotor magnets distributed therealong, each rotor magnet having an RFID tag attached thereto containing a unique identification character serving to identify the rotor magnet; a stator having a plurality of pole teeth separated by axially extending slots, each one of the pole teeth having a power coil wound thereabout; a plurality of RFID interrogation antennae each mounted adjacent a different one of the pole teeth for providing r.f. interrogation signals for the RFID tags for enabling the RFID tags to broadcast an r.f. signal containing the unique identification character to an interrogating one of the antennae when a given one of the RFID tags is within the broadcast range of a given one of the antennae, the unique identification signal serving to identify the particular one of the rotor magnets entering the broadcast range; an RFID reader coupled to the antennae for generating the r.f. interrogation signals, the RFID reader having an output for manifesting the unique identification signal; and a motor controller and driver unit having an input coupled to the output of the RFID reader for receiving the unique identification signal and an output for providing power coil driving signals at least partially dependent upon the unique identification signal.

In this embodiment, adjacent magnets along said surface are preferably arranged with opposite magnetic polarities, and the rotor surface is preferably an outer substantially cylindrical surface.

Each power coil may be connected in a star configuration. For more precise commutation control, each power coil is individually coupled to the motor controller and driver unit to enable individual application of power to each of the power coils.

From a process standpoint, the invention comprises a method of initially calibrating a brushless D.C. motor after assembly, the motor having a rotor provided with a plurality of rotor magnets distributed along a surface thereof, each rotor magnet having an RFID tag attached thereto containing a unique identification character serving to identify the rotor magnet; a stator having a plurality of pole teeth separated by axially extending slots, each one of the pole teeth having a power coil wound thereabout; and a plurality of RFID interrogation antennae each mounted adjacent a different one of the pole teeth for providing r.f. interrogation signals for the RFID tags for enabling the RFID tags to broadcast an r.f. signal containing the unique identification character to an interrogating one of the antennae when a given one of the RFID tags is within the broadcast range of a given one of the antennae, the unique identification signal serving to identify the particular one of the rotor magnets entering the broadcast range, the method comprising the steps of:

(a) generating an emf in the power coil of at least some of the pole teeth by rotating the rotor;

(b) correlating the identity of each rotor magnet responsible for the generation of the emf in step (a);

(c) examining each emf waveform generated in step (a);

(d) comparing each waveform with a standard waveform; and (e) computing a correction factor correlated to rotor magnet identity and power coil identity.

After calibration, the motor is operated by using the correction factor computed in step (e) to control the application of power to a given power coil when the corresponding rotor magnet is positioned in the magnetic range of the given power coil.

The invention avoids the deficiencies inherent with brushless D.C. motor designs using Hall effect rotor magnet position sensors in a number of ways. Firstly, RFID tags and the associated antennae do not suffer from the temperature dependencies inherent in Hall effect sensors and are consequently more reliable in operation over a given temperature range. Further, RFID tag and antennae systems are capable of reliable operation up to about 250 degrees Centigrade, which far exceeds the maximum operating temperature of Hall effect sensors (about 120 degrees Centigrade). The working temperature of most brushless D.C. motors lies below 250 degrees Centigrade. In addition, RFID tag and antennae systems are relatively immune from environmental contamination, and can operate reliably in oily and dusty environments. Perhaps most importantly, the invention provides the capability of identifying each particular rotor magnet and correlating the position of each magnet to the pole teeth of the stator as the rotor revolves. This permits the application of power to the stator coils in a manner tailored to each magnet-pole tooth combination, which greatly improves the efficiency of the motor operation.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 3:
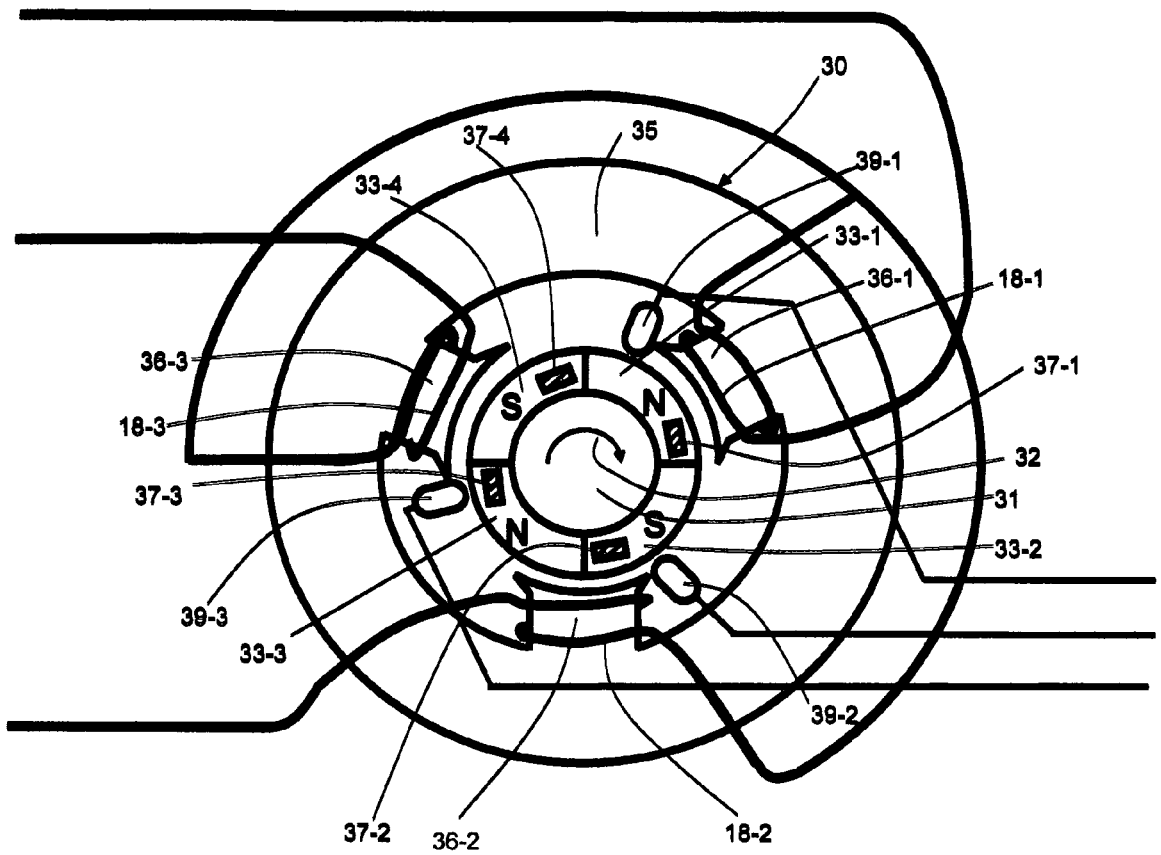
FIG. 3 is a schematic sectional view taken normal to the rotational axis of a brushless D.C. motor incorporating the invention.

Turning now to the drawings, FIG. 3 is a sectional view of a first embodiment of the invention. As seen in this Fig., a brushless D.C. motor 30 includes a rotor 31 mounted for rotation in a direction suggested by arrow 32. A plurality of permanent magnets 33-1 . . . 33-4 is secured to the outer surface of rotor 31. The magnets 33-1 . . . 33-4 are arranged in alternating magnetic polarities, such that the north pole of magnet 33-1 is flanked by the south poles of magnets 33-2 and 33-4, the south pole of magnet 33-2 is flanked by the north poles of magnets 33-1 and 33-3, etc. Rotor 31 is concentrically mounted within a stator 35 fabricated from a magnetizable material, such as a laminated stack of steel plates, and having a plurality of pole teeth 36-1 . . . 36-3 and a corresponding plurality of axially extending unnumbered slots between pole teeth 36-1 . . . 36-3. Power distribution coils 18-1 . . . 18-3 are individually wound about pole teeth 36-1 . . . 36-3, and these coils are connected in a star configuration to the electrical power source shown in FIG. 4. Rotor 31 is caused to rotate by the proper sequential application of electrical power to coils 18-1 . . . 18-3, which generate magnetic fields capable of interacting with the magnetic fields permanently generated by rotor magnets 33-1 . . . 33-4 to provide rotational force to rotor 31.

Attached to each rotor magnet 33-1 . . . 33-4 is an RFID tag 37-1 . . . 37-4. Each RFID tag 37-1 . . . 37-4 includes a loop antenna and an RFID chip, such as that shown and described in U.S. Pat. No. 6,154,137 issued Nov. 28, 2000, the disclosure of which is hereby incorporated by reference. Generally, an RFID tag has the antenna and the RFID chip mounted on or encapsulated in a thin substrate, such as a polyethylene terephthalate (PET) substrate as disclosed in U.S. Pat. No. 6,373,708 B1 issued Apr. 16, 2002, the disclosure of which is hereby incorporated by reference. The RFID tag is bonded to the associated rotor magnet using a suitable adhesive capable of forming a strong adhesive bond to the magnet surface. The RFID chip may be a commercially available integrated circuit device (such as the μ-chip available from Hitachi Ltd), or a custom-designed integrated circuit device, having the standard internal functional components commonly found in an RFID (radio frequency identification) integrated circuit. Such standard components include an RF and analog section, a CPU, a ROM and an EEPROM (see 1999 IEEE International Solid-State Circuits Conference publication 0-7803-5129-0/99, FIG. 9.1.1: RFID transponder IC block diagram). The RFID chip receives power from interrogation loop antennae 39-1 . . . 39-3 described below when interrogated by an RFID reader, and communicates with the RFID reader using standard protocols, such as the ISO 14443 protocol or the ISO 15693 protocol. The size of a standard RFID chip is on the order of 1.4×1.3 mm, with a thickness of about 0.13 mm. The size of the Hitachi μ-chip is 0.4 mm by 0.4 mm. Stored in the EEPROM portion of each RFID chip is an identification character unique to that chip, which in turn provides a unique identification for the magnet on which the RFID tag bearing the chip is mounted.

Each loop antenna 39-1 . . . 39-3 is positioned adjacent an associated one of pole teeth 36-1 . . . 36-3, preferably closely adjacent the leading edge of the associated pole tooth. The leading edge is defined by the direction of rotation of rotor 31, shown as clockwise in FIG. 3. The association between a given loop antenna 39-1 . . . 39-3 and a given pole tooth 36-1 . . . 36-3 is stored in a motor controller and driver 41 described below.

Figure 4:
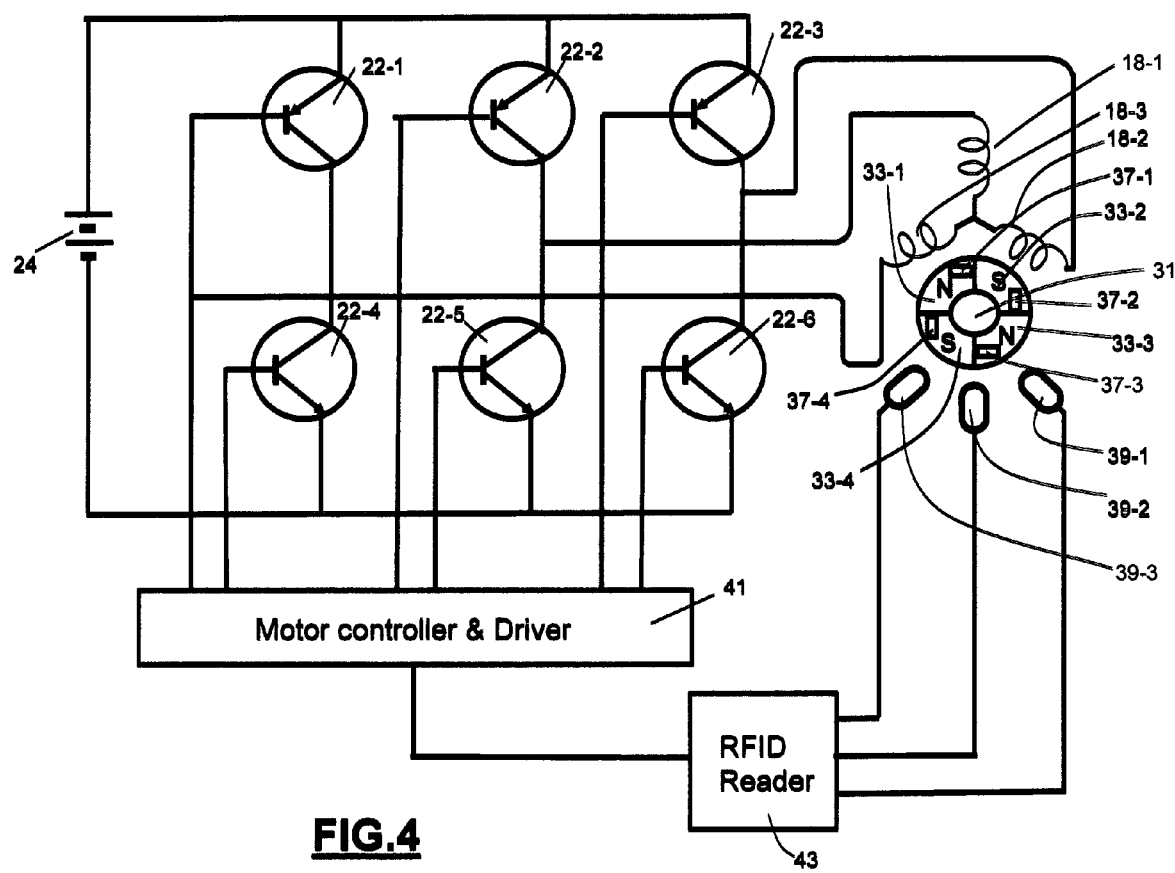
FIG. 4 is a schematic partial block diagram of the power switching and distribution circuitry for the brushless D.C. motor illustrated in FIG. 3.

With reference to FIG. 4, which is a schematic partial block diagram of the power switching and distribution circuitry for the brushless D.C. motor illustrated in FIG. 3, each loop antenna 39-1 . . . 39-3 is continuously energized during operation of motor 30 by an RFID reader 43. When a given RFID tag 37-1 . . . 37-4 enters the broadcast field of an antenna 39-1 . . . 39-3, it receives an r.f. interrogation signal, which contains electromagnetic energy sufficient to power up the RFID chip. In response, the RFID tag generates an r.f. signal containing its identification character, which is sensed by the nearby antenna 39-1 . . . 39-3. This sensed character information is coupled to RFID reader 43. The character information received by RFID reader 43 is decoded into digital form and coupled as position signals and rotor magnet identification information to motor controller and driver unit 41. Unit 41 incorporates a microcontroller which processes these feedback signals and uses the positioning information contained therein to control the operation of a bank of power switching transistors 22-1 . . . 22-6 connected as shown, which are used to apply electrical power from a D.C. source (illustrated as a battery 24) to the stator coils 18-1 . . . 18-3. By properly sequencing the application of electrical power to coils 18-1 . . . 18-3, the rotor 31 is caused to rotate at the desired speed, thereby operating the motor.

The use of the combination of RFID tags 37-1 . . . 37-4 mounted on individual rotor magnets 37-1 . . . 37-4, RFID interrogation antennae 39-1 . . . 39-3, and RFID reader 43 affords several advantages over Hall effect based rotor magnet position sensor systems. Firstly, the operating characteristics of the components of RFID tags 37-1 . . . 37-4 and interrogation antennae 39-1 . . . 39-3 are relatively immune to ambient temperature changes. Consequently, temperature compensation routines are usually not required for systems incorporating the invention. In addition, RFID tag based systems are capable of reliable operation at temperatures up to 250 degrees Centigrade. This upper limit is higher than the maximum working temperature of most brushless D.C. motors. Further, the performance of RFID tag based systems is relatively immune to ambient contamination caused by oil or dirt, thus reducing the need for frequent cleaning of the motor interior attendant with Hall effect based sensor systems.

In addition to the above advantages, the invention provides additional improvements to the operation of brushless D.C. motors. Because the r.f. signals generated by RFID tags 37-1 . . . 37-3 contain the unique identification character, the information signals supplied to the motor controller and driver 41 identify the particular rotor magnet entering the operating field of a given power distribution coil 18-1 . . . 18-3. In response, the motor controller and driver 41 can tailor the amount and time of application of electrical power to power distribution coils 18-1 . . . 18-3 to the magnetic field characteristics of the particular magnet entering the operating field of the power distribution coil. This affords much more precise operating conditions for the motor 30, substantially reducing or eliminating entirely any mechanical vibrations caused by less precise power distribution techniques.

In order to calibrate the system, after assembly the motor 30 is operated in a generator mode in which rotor 31 is mechanically rotated in the rotational direction of arrow 32. The emf induced in coils 18-1 . . . 18-3 by the movement of rotor magnets 33-1 . . . 33-4 through the field region of the coils is examined by motor controller and driver 41 and the waveforms are processed to calculate correction factors for each coil-magnet combination. More specifically, the magnetic interaction between a given rotor magnet and a given coil can vary with the strength and distribution of the magnet field produced by the rotor magnet, the physical contour, angular position, and magnetic susceptibility of each pole tooth, and the electro-magnetic characteristics of the coil. The total effect of all of these parameters is evidenced by the emf waveform obtained for each magnet-coil combination when the motor 30 is operated in the generator mode. Any deviation from the ideal waveform can be corrected by using the calculated correction factor when applying power to a given coil-magnet combination. For example, if the angular position of a given pole tooth is offset from the design value (lack of circular symmetry), the electrical power to the corresponding coil can be delayed or advanced (depending on the direction of angular skew) to compensate for this asymmetry. Similarly, if the pole tooth is misshapen, this irregularity will be evidenced by the emf waveform, for which a correction factor can be calculated to compensate for this irregularity. In this way, motor 30 can be operated with increased efficiency approaching the ideal, which results in minimum motor vibrations caused by non-ideal power commutation and distribution and maximum power efficiency.

Figure 1:
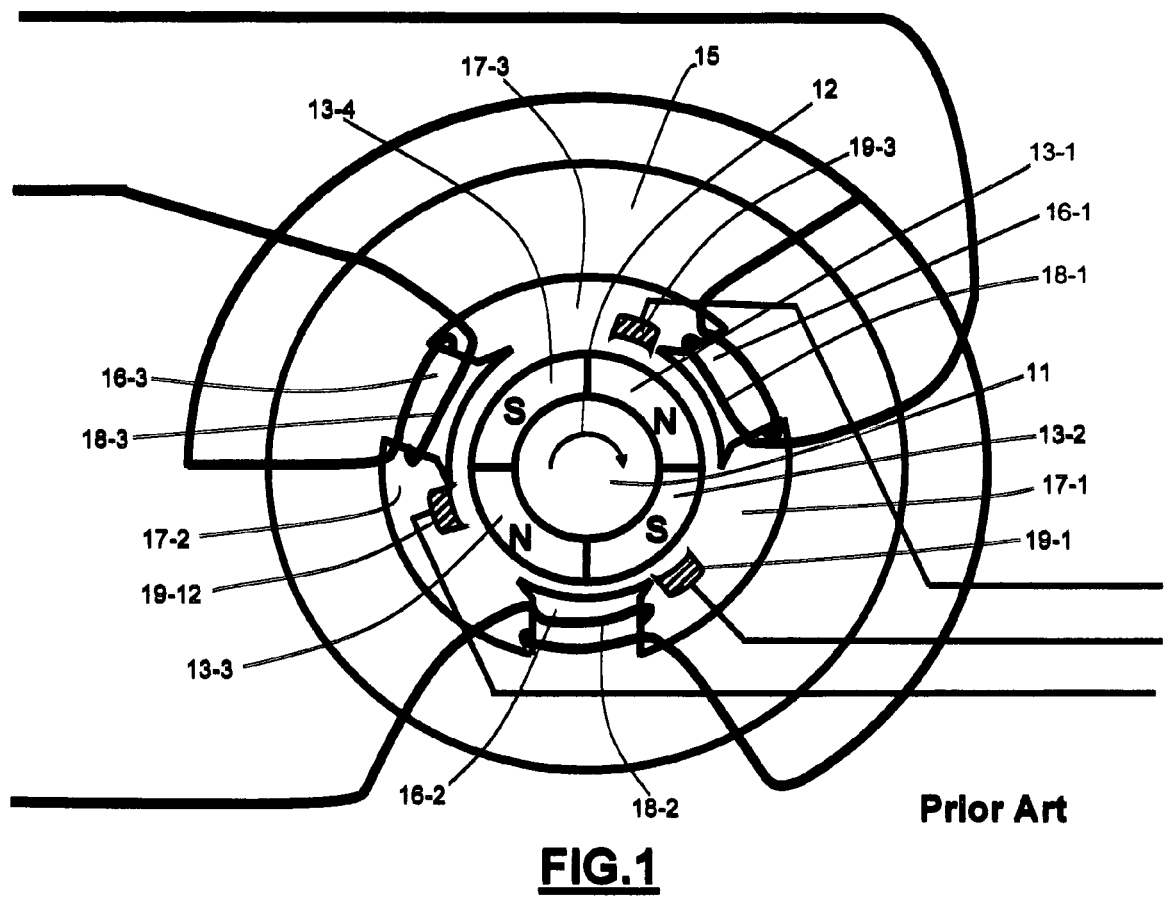
FIG. 1 is a schematic sectional view taken normal to the rotational axis of a known type of brushless D.C. motor using Hall effect sensors.
Figure 2:
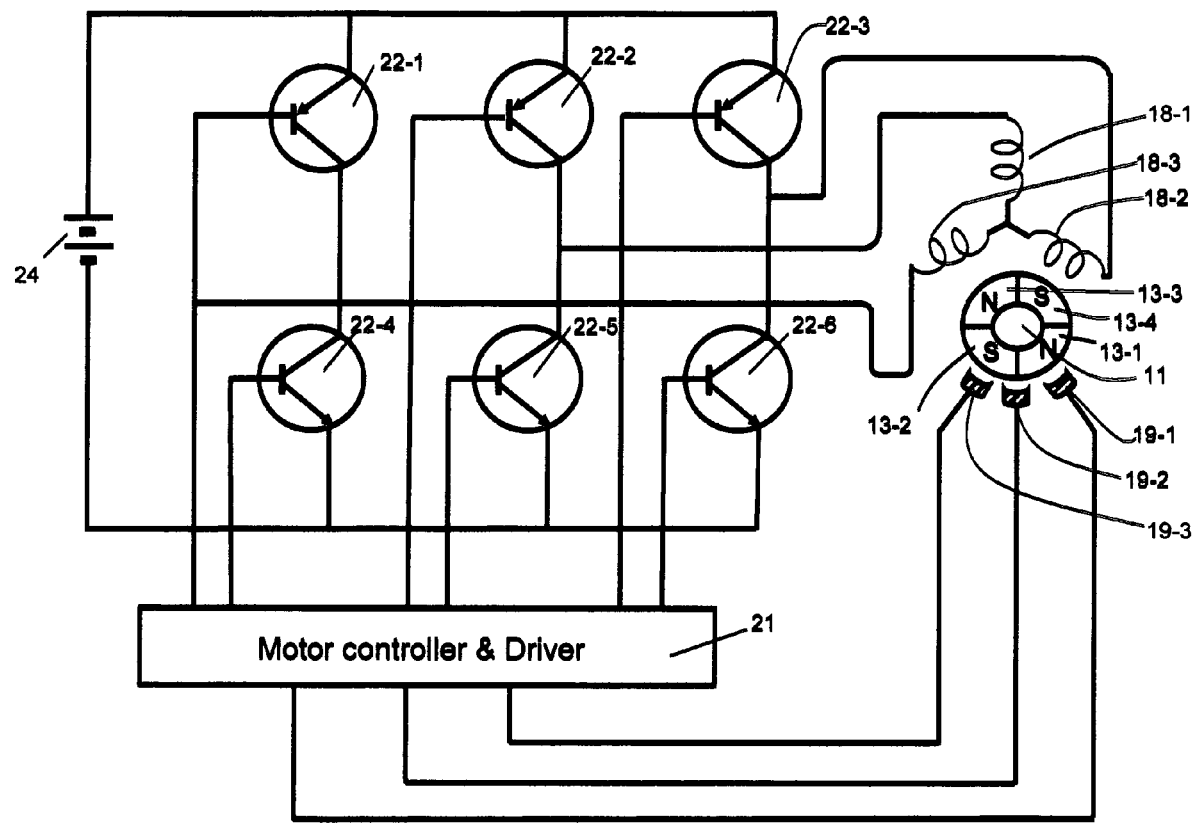
FIG. 2 is a schematic partial block diagram of the power switching and distribution circuitry for the brushless D.C. motor illustrated in FIG. 1.
Figure 5:
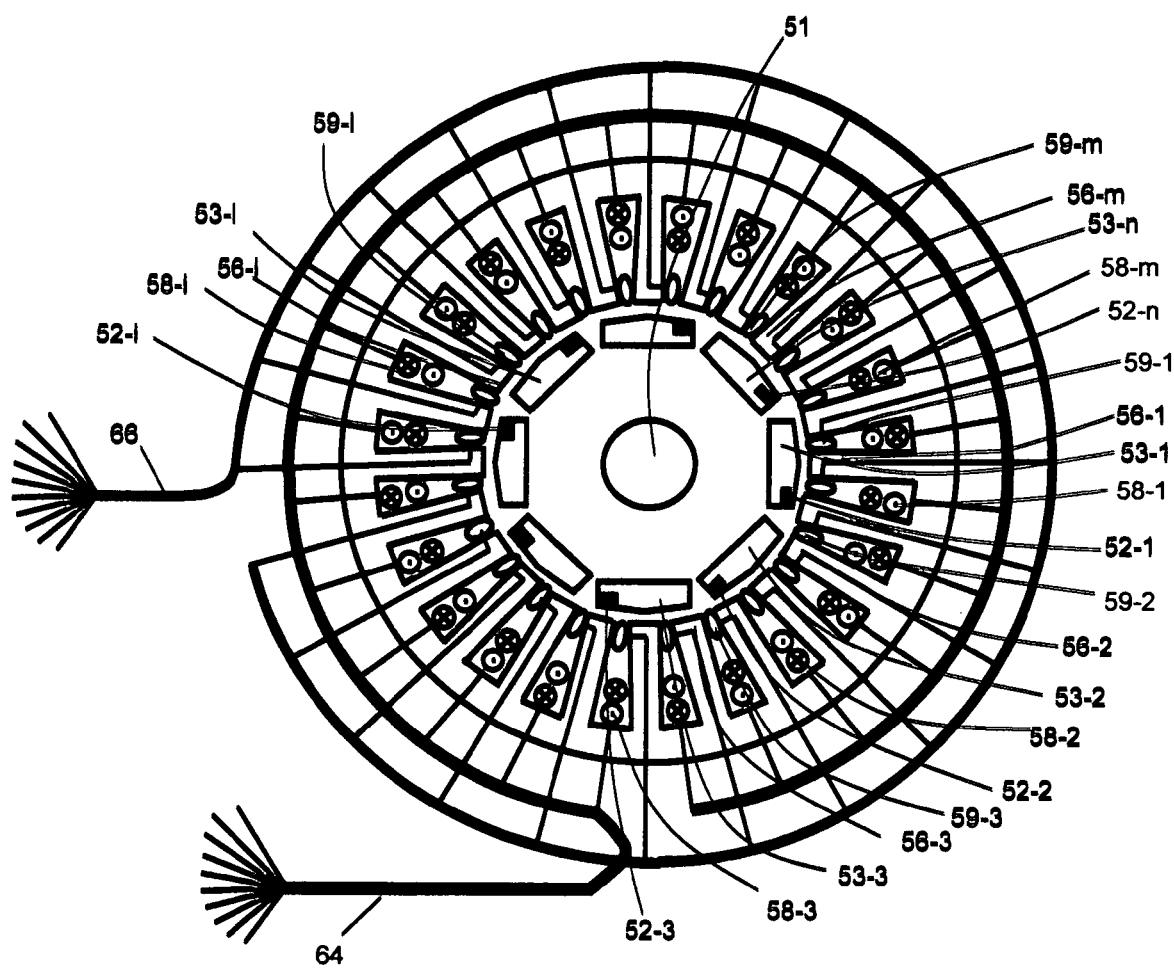
FIG. 5 is a view similar to FIG. 3 illustrating an embodiment of the invention having a relatively large number of permanent magnets and magnet position identifiers.
Figure 6:
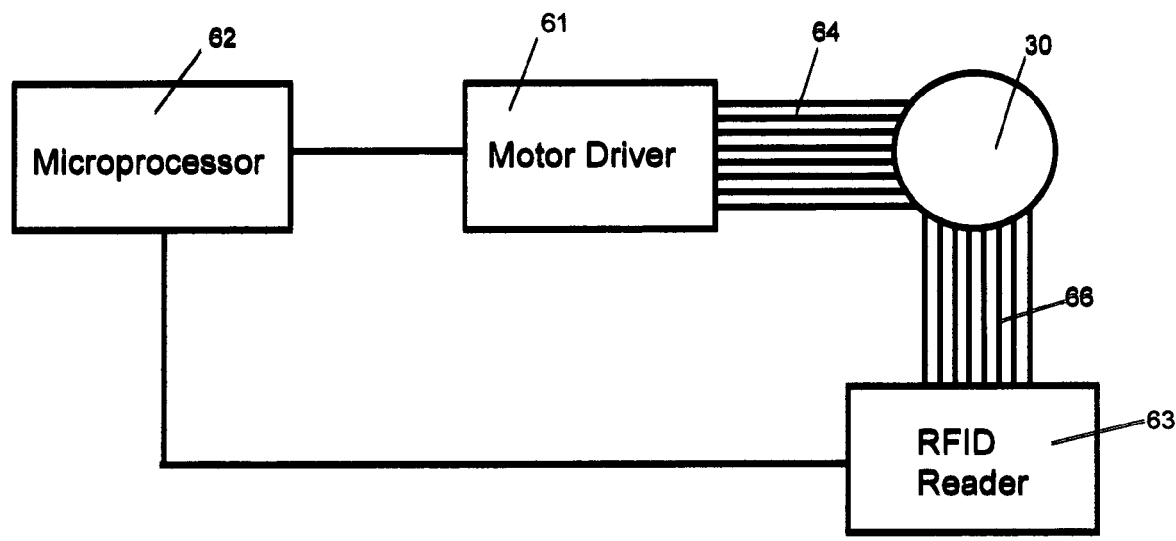
FIG. 6 is a view similar to FIG. 4 showing a block diagram of the power switching and distribution circuitry providing individual power control for the power coils of the embodiment illustrated in FIG. 5.

The embodiment described above with reference to FIGS. 3 and 4 uses the same star configuration for power distribution coils 18-1 . . . 18-3 as that shown in the prior art example of FIGS. 1 and 2. In this configuration, the coils 18-1 ,,, 18-3 are interconnected as shown with one terminal of each coil connected in common. Even further efficiencies can be obtained with brushless D.C. motors according to the invention by connecting the power distribution coils independently to a driver circuit and operating each coil in an independent manner. This embodiment is illustrated in FIGS. 5 and 6. As seen in these Figs., a brushless D.C. motor has a rotor 51 provided with a plurality of rotor permanent magnets 53-$n$. A plurality of RFID tags 52-$n$ is attached to the magnets 53-$n$, with each RFID tag 52-$i$ having a unique identification character stored therein serving to identify the rotor magnet 53-$i$ to which the RFID tag is attached. A plurality of pole teeth 56-$m$ are distributed about the inner circumference of a stator, each pole tooth 56-$i$ having a power coil 58-$i$ associated thereto. A plurality of interrogation antennae 59-$m$ are positioned adjacent each of pole teeth 56-$m$ on a one-to-one basis. Interrogation antennae 59-$m$ are coupled via conductors 66 to an RFID reader 63, which has outputs connected to a microprocessor 62. The outputs from microprocessor 62 supply supervisory and control signals to a motor driver 61. The individual outputs from motor driver 61 are connected individually to power coils 58-$m$ in such as manner as to enable individual application of electrical power to individual coils 58-$m$. More particularly, a pair of conductors from conductor group 64 is coupled to each end of a given power coil 58$i$ so that voltage and current is supplied to each power coil on an individual basis. By enabling the individual application of driving power to the coils 58-$m$, the motor of FIGS. 5 and 6 can be most precisely controlled to optimize the operation of the motor and minimize power consumption and mechanical vibrations caused by power commutation errors inherent in the star configuration arrangement.

As will now be apparent, brushless D.C. motor assemblies fabricated according to the teachings of the invention are capable of much more efficient operation than such motors using Hall effect sensors or other rotor magnet position sensors having temperature compensation requirements, limited maximum temperature operating constraints and susceptibility to contaminated environmental conditions. In addition, the rotor magnet identification capability afforded by the use of RFID tags as position sensors provides the additional capability of optimizing the operation of the power distribution circuitry.

While the invention has been described with reference to particular embodiments, various modifications, alternate constructions and equivalents may be employed without departing from the spirit of the invention. For example, while the embodiments illustrated and described are directed to a motor construction in which the rotor is positioned internal to the surrounding stator, the principles of the invention apply with equal force to the reverse configuration in which the stator is positioned internal to a surrounding rotor. In such a configuration, the rotor magnets are distributed about an inner mounting surface of the rotor, along with the RFID tags, and the pole teeth, power coils and interrogation antenna are distributed about an outer surface of the stator. Therefore, the above should not be construed as limiting the invention, which is defined by the appended claims.

What is claimed is:

1. A brushless D.C. motor comprising:
   a rotor having a surface with a plurality of permanent rotor magnets distributed therealong, each said rotor magnet having an RFID tag attached thereto containing a unique identification character serving to identify the rotor magnet;
   a stator having a plurality of pole teeth separated by axially extending slots, each one of said pole teeth having a power coil wound thereabout; and
   a plurality of RFID interrogation antennae each mounted adjacent a different one of said pole teeth for providing r.f. interrogation signals for said RFID tags for enabling said RFID tags to broadcast an r.f. signal containing said unique identification character to an interrogating one of said antennae when a given one of said RFID tags is within the broadcast range of a given one of said antennae, said unique identification signal serving to identify the particular one of said rotor magnets entering said broadcast range.

2. The invention of claim 1 wherein adjacent magnets along said surface are arranged with opposite magnetic polarities.

3. The invention of claim 1 wherein said rotor surface is an outer substantially cylindrical surface.

4. The invention of claim 1 wherein each said power coil is connected in a star configuration.

5. The invention of claim 1 further including an RFID reader coupled to said antennae for generating said r.f. interrogation signals.

6. The invention of claim 5 wherein said RFID reader has an output for manifesting said unique identification signal; and further including a motor controller and driver unit having an input for receiving said unique identification signal and an output for providing power coil driving signals at least partially dependent upon said unique identification signal.

7. The invention of claim 6 wherein each said power coil is individually coupled to said motor controller and driver unit to enable individual application of power to each said power coil.

8. The invention of claim 1 wherein said rotor is configured for rotation within said stator.

9. A brushless D.C. motor system comprising:
   a rotor having a surface with a plurality of permanent rotor magnets distributed therealong, each said rotor magnet having an RFID tag attached thereto containing a unique identification character serving to identify the rotor magnet;
   a stator having a plurality of pole teeth separated by axially extending slots, each one of said pole teeth having a power coil wound thereabout;
   a plurality of RFID interrogation antennae each mounted adjacent a different one of said pole teeth for providing r.f. interrogation signals for said RFID tags for enabling said RFID tags to broadcast an r.f. signal containing said unique identification character to an interrogating one of said antennae when a given one of said RFID tags is within the broadcast range of a given one of said antennae, said unique identification signal serving to identify the particular one of said rotor magnets entering said broadcast range;

an RFID reader coupled to said antennae for generating said r.f. interrogation signals, said RFID reader having an output; and a motor controller and driver unit having an input coupled to said output of said RFID reader for receiving said unique identification signal and an output for providing power coil driving signals at least partially dependent upon said unique identification signal.

10. The invention of claim 9 wherein adjacent magnets along said surface are arranged with opposite magnetic polarities.

11. The invention of claim 9 wherein said rotor surface is an outer substantially cylindrical surface.

12. The invention of claim 9 wherein each said power coil is connected in a star configuration.

13. The invention of claim 1 each said power coil is individually coupled to said motor controller and driver unit to enable individual application of power to each said power coil.

14. A method of initially calibrating a brushless D.C. motor after assembly, the motor having a rotor provided with a plurality of rotor magnets distributed along a surface thereof, each rotor magnet having an RFID tag attached thereto containing a unique identification character serving to identify the rotor magnet; a stator having a plurality of pole teeth separated by axially extending slots, each one of the pole teeth having a power coil wound thereabout; and a plurality of RFID interrogation antennae each mounted adjacent a different one of the pole teeth for providing r.f. interrogation signals for the RFID tags for enabling the RFID tags to broadcast an r.f. signal containing the unique identification character to an interrogating one of the antennae when a given one of the RFID tags is within the broadcast range of a given one of the antennae, the unique identification signal serving to identify the particular one of the rotor magnets entering the broadcast range, said method comprising the steps of:

(f) generating an emf in the power coil of at least some of the pole teeth by rotating the rotor;

(g) correlating the identity of each rotor magnet responsible for the generation of the emf in step (a);

(h) examining each emf waveform generated in step (a);

(i) comparing each waveform with a standard waveform; and (j) computing a correction factor correlated to rotor magnet identity and power coil identity.

15. The method of claim 14 further including the step (f) of using the correction factor computed in step (e) to control the application of power to a given power coil when the corresponding rotor magnet is positioned in the magnetic range of the given power coil during operation of the motor.

* * * * *